No. 817,768. PATENTED APR. 17, 1906.
C. E. HARRIS.
PHOTOGRAPHIC DEVELOPING APPARATUS.
APPLICATION FILED AUG. 10, 1905.
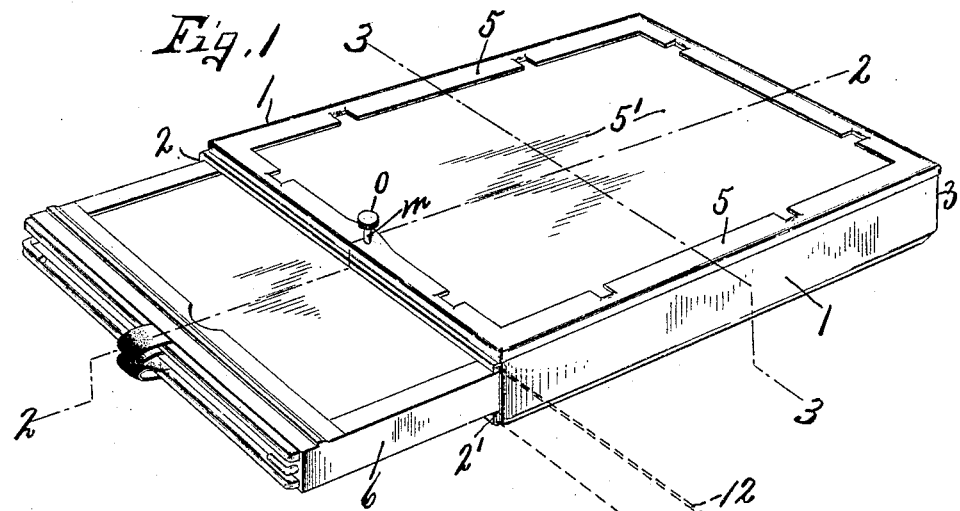
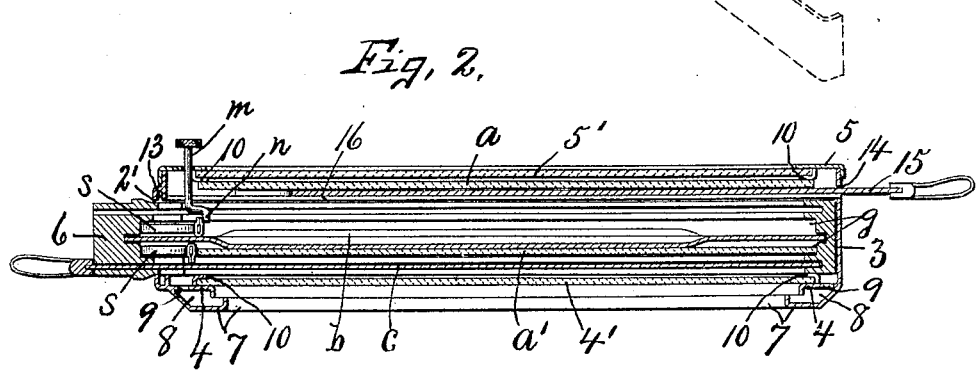
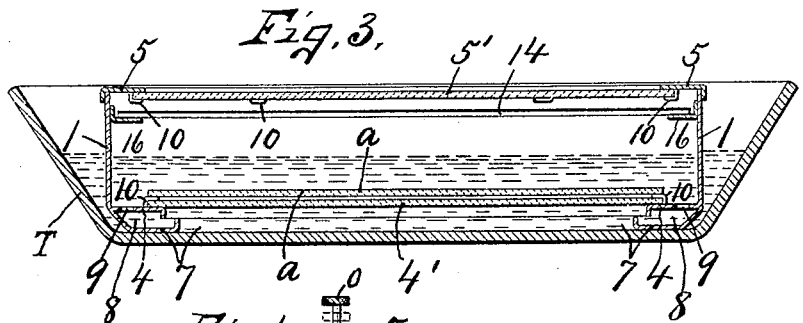
Witnesses:
F. E. Arthur.
H. E. Chase.
Inventor.
Charles E. Harris.
By Howard P. Denison
Attorney.

UNITED STATES PATENT OFFICE.

CHARLES E. HARRIS, OF SYRACUSE, NEW YORK.

PHOTOGRAPHIC DEVELOPING APPARATUS.

No. 817,768.

Specification of Letters Patent.

Patented April 17, 1906.

Application filed August 10, 1905. Serial No. 273,627.

*To all whom it may concern:*

Be it known that I, CHARLES E. HARRIS, of Syracuse, in the county of Onondaga, in the State of New York, have invented new and useful Improvements in Photographic Developing Apparatus, of which the following, taken in connection with the accompanying drawings, is a full, clear, and exact description.

This invention relates to certain improvements in photographic developing apparatus in which the essential object is to provide a portable developing-frame for the reception of a plate-holder as it comes from the camera with the inclosed plates and to provide means whereby the plates may be transferred from the plate-holder to the developing-frame without exposure and immersed in a tray containing a small quantity of developer capable of being carried with the rest of the photographic outfit.

The essential purpose of the developer-frame, therefore, is to make it a part of the photographer's outfit to be used in developing the photographic negatives on the spot or before the photographer changes the position of his camera, thus enabling him to make certain that he has a perfect negative before leaving the object.

I am aware that various patents have issued showing different structures of photographic developer-frames adapted to enable the photographer to develop the negatives in the light without the use of a dark room; but I have sought to advance the art by providing a developer-frame which is adapted to receive an ordinary plate-holder as it comes from the camera with the plates and shutter-slides therein, so that the combined frame and holder will not occupy much more space than the ordinary holder, and at the same time the light is as perfectly shut out from contact with the plates while the plate-holder is in the developer-frame as it would be in the camera itself, thus enabling me to develop the plates at any convenient time, either immediately after the exposure in the camera or at any subsequent time, without the use of a dark room.

Other objects and uses relating to certain specific parts of the developer-frame will be brought out in the following description.

In the drawings, Figure 1 is a perspective view of my improved developer-frame, showing an ordinary double-plate holder therein, but as partially withdrawn. Figs. 2 and 3 are sectional views taken, respectively, on lines 2 2 and 3 3, Fig. 1, except that in Fig. 2 the plate-holder is inserted to the limit into the developer-frame and one of the plates to be developed is shown as temporarily suspended in the developer-frame preparatory to removing the plate-holder with the other plate therefrom, while in Fig. 3 the plate-holder is removed and the developer-frame is shown as immersed into a suitable tray containing the liquid developer and the plate to be developed is shown as resting upon the bottom of the frame and submerged in the liquid developer. Fig. 4 is a sectional view of the end of the frame having the opening for the plate-holder and showing the closure for said opening in operative position.

In carrying out the objects stated I provide a substantially rectangular open frame of non-corrodible material, such as hard rubber, aluminium, or equivalent light and comparatively thin metal, comprising parallel sides 1, front and rear ends 2 and 3, a bottom 4, and a top 5. The bottom 4 and top 5 are merely marginal ledges or flanges projecting inwardly from the sides and ends of the frame, and the intervening space within each marginal edge or flange is supplied with a ruby glass or equivalent medium, as 4' and 5'. The developer-frame therefore comprises, essentially, a box-like structure having the greater portion of its top and bottom composed of glass screens, as of a dark-red or other translucent quality. One end, as the front end 2, of the frame is provided with an opening of substantially the full width from side to side of the frame and of just sufficient depth to receive an ordinary double-plate holder, as 6, Figs. 1 and 2, capable of supporting two sensitive dry-plates and the usual shutters for excluding the light from the plates while in the holder.

The bottom marginal edge 4 is preferably provided with a subledge or marginal foot 7, which is spaced apart from the ledge 4 and has its outer edge united thereto, forming a channel or passage 8 between the two ledges 4 and 7 and extending entirely around the frame.

The inner edge of the flange or marginal foot 7 and also the inner edge of the ledge 4 are turned or bent toward each other, but in different vertical planes, and terminate in substantially the same horizontal plane for the purpose of allowing the developer to flow between the inner edges of the ledges 4 and 7 into the channel or passage-way 8, from which it is free to pass through suitable apertures 9 in the ledge 4 and above the bottom glass 4', as best seen in Figs. 2 and 3 and also in Fig. 4, the purpose of terminating the horizontal edges of both flanges or ledges 4 and 7 in substantially the same horizontal plane being to prevent the entrance of light into the passage 8 and thence into the interior of the frame through the openings 9.

The screens 4' and 5' are permanently secured in place by stamping or pressing up suitable tongues 10 from the ledges 4 and 5 and inserting the edges of the screens between said tongues and ledges, as best seen in Figs. 2 and 3.

The opening, as 2', in the front end of the developer-frame is provided with a shutter-slide or closure 12, which is removably inserted in ways 13 on the front end of the developer-frame to close the opening 2' and to exclude the light from the plate which may be left in the frame to be developed after the plate-holder has been removed.

The rear end of the developer-frame is provided with a transverse slot or narrow opening 14 of just sufficient size to receive a sliding shutter-plate 15, which is sufficiently large to cover and exclude the light from one of the sensitized plates which may be deposited in the frame during the withdrawal of the plate-holder, so as to prevent the action of the light upon the inclosed plate while the opening 2' is uncovered.

The plate-holder, as 6, containing two dry-plates, as $a$ and $a'$, and also containing the usual central partition $b$ and opposite slides or shutters $c$, one for each plate, is inserted, as shown in Figs. 1 and 2, through the opening 2' in the front end of the developer-frame, the latter being of sufficient size to receive and entirely inclose the dry-plates, although the head of the plate-holder may protrude through the opening 2', as seen in Fig. 2.

After the plate-holder has been inserted to the limit into the developer-frame, as just described, the upper slide or shutter $c$ is withdrawn, and the frame is partially inverted to allow the plate, as $a$, to tilt or move to the upper side of the opening 2' and slot 14, whereupon a slide, as 15, which may be one of the shutters $c$, is inserted through the slot 14 along the under side of the glass plate $a$, thereby holding said plate between the slide 15 and screen 5', so as to exclude the light from contact with the sensitized plate $a$ while the plate-holder is being withdrawn and the gate or closure 12 is being placed in operative position to close the opening 2'.

When the gate 12 is properly closed, the slide 15 is withdrawn from the slot 14, thereby allowing the plate $a$ to rest upon the bottom glass 4' with its sensitized surface uppermost.

The frame, with the plate therein, is then placed in a suitable developing-tray T, with the lower flange or foot 7 resting upon the bottom of the tray, which contains a limited quantity of liquid developer, as best shown in Fig. 3.

As the developer-frame and its inclosed plate are lowered into the developing liquid in the tray T said liquid flows through the opening within the marginal flange or foot 7 and into the marginal channel 8 and through the apertures 9 into the interior of the frame, where it overflows the sensitized surface of the plate $a$, the whole device, including the tray and its developer, being portable and easily rocked from side to side to cause the developer to flow evenly over and develop the entire surface of the plate.

After the negative is clearly brought out by the developer the developing liquid may be removed from the tray and substituted by water for the usual water-bath to cleanse the plate from the developer, after which the water may be removed from the tray and substituted by a suitable fixing liquid, such operations being readily performed without removing the plate from the developer-frame. These plates $a$ and $a'$ are held in place in the holder in the usual manner by suitable springs $s$, which press the plates endwise into their respective receiving-grooves, as $g$, and by compressing these springs said plates may be removed in the usual manner through the adjacent sides of their holder.

In view of the fact that the plate-holder with the plates therein after being taken from the camera is inserted directly into the developer-frame between the glasses 4' and 5', thereby entirely concealing the portion of the holder containing the plates within said frame, it clearly becomes necessary to provide means for compressing one of the springs while the holder is in the frame. As best seen in Fig. 2, this means consists of a rotatable plunger $m$, having an eccentric inner end $n$ and a suitable handpiece $o$ at its outer end. This plunger is journaled in the upper marginal flange 5 at the end nearest the opening 2' and its inner eccentric end is adapted to engage and compress the spring $s$ to allow the glass plate $a$ to be released and shifted by the inversion of the frame from the holder to the opposite side of the slot 14, where it is held and concealed from the light by slide 15, said slide having its inner end slotted a short distance to receive the plunger $m$.

It will be observed upon reference to Fig. 2 that the plunger $m$ extends across the slot or guide in which one of the slides, as $c$, is normally located, and therefore this slide has to be removed before the eccentric end of the plunger $m$ can be brought into engagement with the adjacent spring *s* for releasing the plate held thereby, while, on the other hand, when it is desired to reinsert said slide it is necessary to draw the plunger *m* outwardly to free it from the path of the slide.

What I claim is—

1. In a photographic developing apparatus, a comparatively shallow rectangular open developer-frame having an opening in one end between its top and bottom to receive a plate-holder and provided with apertures in its bottom for admitting the developer liquid to the interior of the frame and translucent plates secured in the frame at opposite sides of said opening.

2. A photographic developer-frame and opposite ruby plates spaced apart and supported in the frame to receive between them a plate-holder containing the plate to be developed, and means to release said plate from its holder while in the frame, whereby the plate may be transferred from the holder to the interior of the frame by tilting the frame with the holder therein.

3. A photographic developing apparatus comprising a light, portable box-like frame having an opening in one end between its top and bottom to receive a plate-holder, guides at opposite sides of the opening and a closure for said opening slidable in said guides.

4. A photographic developing apparatus, comprising a box-like frame having an opening in one end between its top and bottom through which the usual plate-holder may be inserted into and removed from the interior of the frame, means for releasing the plate from the holder while in the frame, whereby said plate may be left in the frame when the holder is removed, a sliding plate to hold the photographic plate while removing the holder and a sliding closure for said opening to exclude light from the interior of the frame.

5. In a photographic developing apparatus, a box-like frame having a comparatively narrow inwardly-projecting marginal ledge at the top and also at the bottom, and a marginal flange underlying the bottom ledge and forming therewith a channel, said bottom ledge and flange having their inner edges turned toward each other, but in different vertical planes, and the bottom ledge having openings therein connecting the channel with the interior of the frame.

In witness whereof I have hereunto set my hand this 2d day of August, 1905.

CHARLES E. HARRIS.

Witnesses
  H. E. CHASE,
  M. M. NOTT.